UNITED STATES PATENT OFFICE.

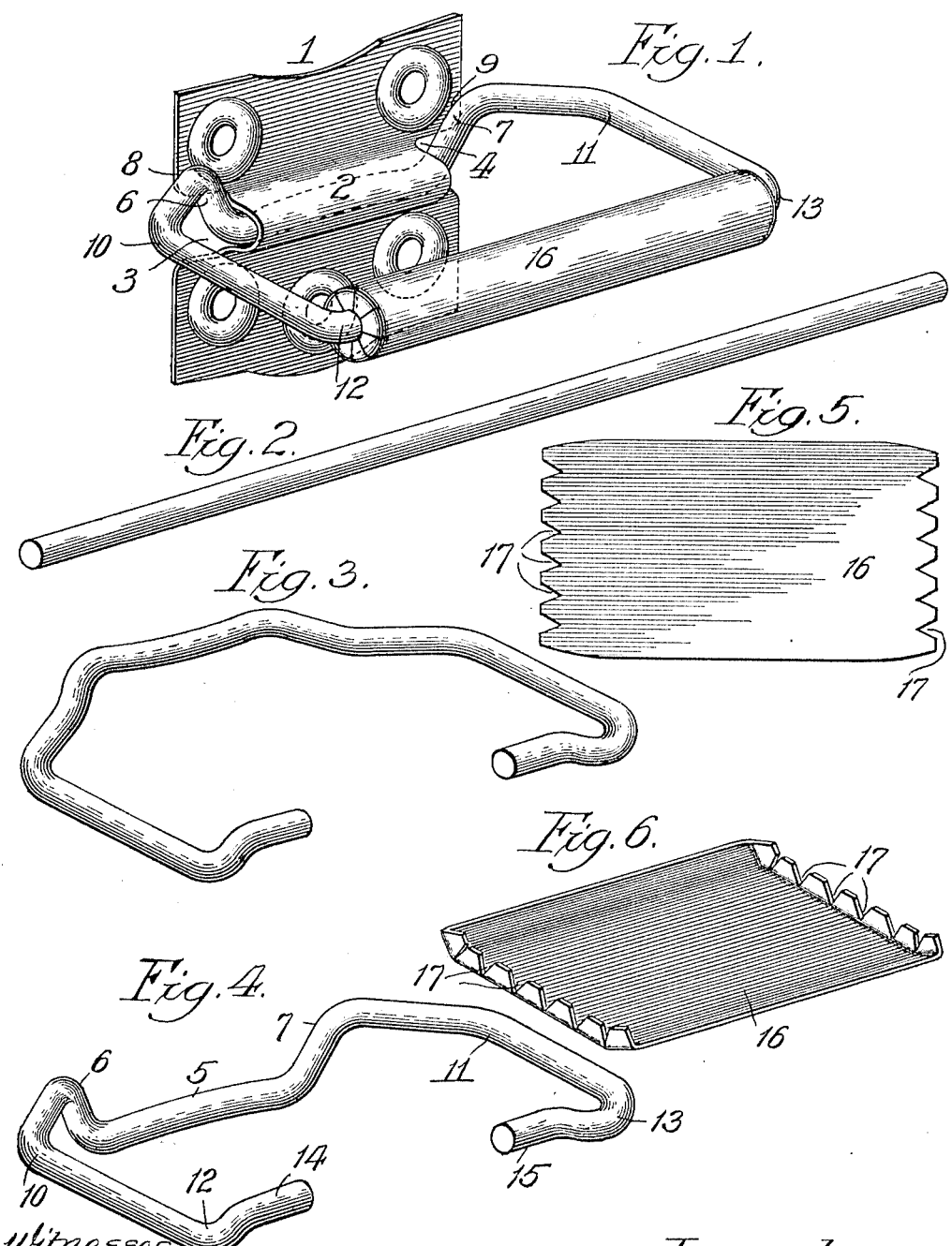

EDWARD L. WATROUS, OF DES MOINES, IOWA, ASSIGNOR TO DAVID B. GANN, OF CHICAGO, ILLINOIS.

HANDLE.

1,040,596. Specification of Letters Patent. Patented Oct. 8, 1912.

Application filed December 1, 1911. Serial No. 663,272.

*To all whom it may concern:*

Be it known that I, EDWARD L. WATROUS, a citizen of the United States, residing at Des Moines, in the county of Polk and State of Iowa, have invented new and useful Improvements in Handles, of which the following is a specification.

It is the object of the present invention to provide an all metal handle suitable for use on tubs, washing machines and the like and built up of wrought metal parts, substantially indestructible in character.

More particularly it is my object to provide a handle having a grip of large diameter built up from a sheet of metal and presenting a maximum gripping surface with a minimum of weight, this grip being so shaped and so related to the bail of the handle as to insure a maximum of convenience and security with a minimum of cost.

In the accompanying drawings, Figure 1 is a perspective view of the handle, completely assembled and ready for use. Figs. 2, 3 and 4 show the bail of the handle in various stages of manufacture. Fig. 5 shows the flat stamping out of which the grip member is formed. Fig. 6 is a perspective view of the grip after its notched ends have been turned up.

In the construction shown in the drawings, the handle comprises a base 1 struck from sheet metal, such as heavy sheet steel, and has a transverse raised portion or rib 2 forming a tubular socket through which the bail of the handle may pass. At each end of this tubular socket, the metal is cut away forming notches 3 and 4. The upper portion of the base 1 is provided with screw holes, each of these holes being surrounded by an annular shoulder pressed up from the body of the metal to stiffen the plate and to permit the use of ordinary flat headed screws in fastening the base to a tub. Three similar screw openings are provided for the lower portion of base 1.

The bail of the handle is made up from a single piece of heavy metal, preferably a cold rolled steel rod, as shown in Fig. 2. This rod is bent by suitable machinery which need not here be described, into the shape shown in Fig. 3 and by a second operation is bent transversely to the shape shown in Fig. 4. When the bail is in its final form as shown in Fig. 4 it comprises a central portion 5 only slightly longer than the tubular socket 2 of the base. At each side of this straight portion, the bail is bent to form shoulders 6 and 7 so positioned that when the bail is in use for lifting, as shown in Fig. 1, these shoulders will strike against the lower corners 8 and 9 of the base plate just outside the annular stiffening shoulders, so that these corners will act as stops to limit the upward swing of the handle. Beyond the shoulders 6 and 7, the bail curves forwardly at 10 and 11 and is then notched back with sharp reverse bends at 12 and 13 and terminates at its ends in short straight lugs 14 and 15, adapted for insertion in a tubular grip with which the handle is provided. The reverse bends at 12 and 13 form pockets for the reception of the inturned ends of the tubular grip and prevent outward movement of the bail with respect to the grip.

The tubular grip 16 of the handle is of sheet metal, preferably heavy sheet steel, and is initially stamped out as shown in Fig. 5 in the form of a rectangular blank, having notches 17 at each end. The next operation in its manufacture consists in turning up the notches and also giving to the outer edges of the blank a slight upward turn, as shown in Fig. 6. In a subsequent operation the blank is compressed or squeezed together so that it rolls up into a tubular grip, as shown in Fig. 1, the notches at the ends closing up to form a tight end for the grip, the two ends fitting respectively in the reverse bends 12 and 13 of the bail. The tubular grip is smooth and tight and is free to rotate on the inturned lugs of the bail. It presents a large holding surface and owing to its hollow interior is relatively light and inexpensive. Through the close engagement of the inturned ends with the reverse bends at the base of each lug of the bail, withdrawal of the bail from the grip is prevented and strong and efficient connection of the bail ends is assured.

When the handle is not in use the grip and bail swing down into contact with the side of the tub out of the way, but when the grip is lifted, the shoulders 6 and 7 of the bail strike against the corners 8 and 9 of the base and serve to limit further upward swinging movement, leaving the handle in position for advantageous use by the operator.

What I claim as new and desire to secure by Letters Patent of the United States, is—

1. An all metal handle comprising a base, a bail pivotally mounted on said base and having shoulders to limit the upward swing of the bail, and a sheet metal grip of tubular form enveloping the outer free ends of the bail, and free to turn thereon.

2. An all metal handle comprising a base, a wire bail pivotally mounted on said base, and a grip consisting of sheet metal shaped into a tube with closed ends, and enveloping the outer free ends of said bail.

3. An all metal handle comprising a base having a tubular socket, a metal bail passing through said socket, and having its ends projecting outward therefrom, said bail having shoulders for contacting with said base to limit the upward swinging of the bail, and a metal plate shaped into a cylindrical grip and having its ends turned inward to engage the outer free ends of said bail.

4. An all metal handle comprising a sheet metal base having notches at each side and a raised portion forming a tubular socket between said notches, a metal bail passing through said socket and having both ends projected outward, said bail having at each side thereof a shoulder arranged to strike against said base when said bail has been raised to position for use in lifting, the outer free ends of said bail having reverse bends, and inturned lugs, a sheet metal plate shaped into a tubular grip, and having its ends swaged inward to engage said bail at said reverse bends, leaving the grip free to rotate about the said inturned lugs.

5. A metal grip consisting of a sheet metal blank rolled up into a tube with the integral ends swaged inward to form closures for the tube and to serve as pivotal bearings for the grip.

6. An all metal handle comprising a base, a wire bail pivotally mounted on said base, said bail having outer free ends carrying inturned lugs, and having a reverse bend near each of said lugs to prevent outward movement of the bail relative to the grip, and a metal grip consisting of a sheet metal blank rolled up into a tube with the ends swaged inward to form closures for the tube, said closures bearing on said bail at the reverse bends thereof.

7. An all metal handle comprising a sheet metal base having a raised portion forming a socket, a metal bail pivotally mounted in said socket, said bail being arranged to strike against said base on either side of said bail socket when said bail has been raised to position for use in lifting, and a metal grip for said bail consisting of a sheet metal blank rolled up into a tube with the ends turned inward to form closures for the tube and to serve as bearings for the grip.

8. An all metal handle comprising a metal base formed with a socket, which is of less width than said base, said base being provided with stops at the sides of said socket, a metal bail pivotally mounted in said socket, said bail and stops being arranged to strike and limit the upward swing of said handle when said bail has been raised to position for use in lifting, and a metal grip for said bail consisting of a sheet metal blank rolled up into a tube with its ends turned inward to form closures for the tube and to serve as bearings for the grip.

9. An all metal handle comprising a sheet metal base having a raised portion forming a socket, stops formed by said base at either side of said socket, said socket being continuous and of less width than said base, a wire bail pivotally mounted in said socket, said bail being arranged to strike against said stops when said bail is raised to position for use in lifting, and a metal grip mounted to turn on said bail, and consisting of a sheet of metal shaped up into a tube and having notched ends which are swaged inward to form closures for the tube, said swaged ends engaging with said bail and leaving said grip free to rotate when in use.

10. In a handle, the combination of an attaching member formed with a transverse U-shape socket, a handle member formed of a section of rod metal bent into an approximately square loop, one side of which is continuous and has pivoted engagement in the aforesaid socket and the opposite side of which in parallel relation to the first mentioned member is formed by the terminal ends of said loop, and a tubular grip member engaging said terminal ends, substantially as set forth.

11. In a handle, the combination of an attaching member formed with a transverse U-shape socket, a handle member formed of a section of rod metal bent into an approximately square loop, one side of which is continuous and has pivoted engagement in the aforesaid socket and the opposite side of which in parallel relation to the first mentioned member is formed by the terminal ends of said loop, and a tubular grip member engaging said terminal ends and formed with slitted inturned ends, substantially as set forth.

12. In a handle, the combination of an attaching plate having bearing for a handle, a handle formed of rod metal, and a tubular grip having terminal ends swaged inwardly to form bearings for said grip, substantially as set forth.

13. In a handle, the combination of an attaching plate having bearing for a handle, a handle member formed of rod metal, and a tubular grip member having terminal ends slitted and inturned to form bearings for said grip, substantially as set forth.

In witness whereof, I hereunto subscribe my name to this specification in the presence of two witnesses.

EDWARD L. WATROUS.

Witnesses:
I. V. CURRAN,
J. C. SHUTTS.

Copies of this patent may be obtained for five cents each, by addressing the "Commissioner of Patents, Washington, D. C."